United States Patent
Dharanipragada et al.

(10) Patent No.: US 7,853,449 B2
(45) Date of Patent: *Dec. 14, 2010

(54) METHODS AND APPARATUS FOR GENERATING DIALOG STATE CONDITIONED LANGUAGE MODELS

(75) Inventors: Satyanarayana Dharanipragada, Ossining, NY (US); Michael Daniel Monkowski, New Windsor, NY (US); Harry W. Printz, San Francisco, CA (US); Karthik Visweswariah, Ossining, NY (US)

(73) Assignee: Nuance Communications, Inc., Burlington, MA (US)

( * ) Notice: Subject to any disclaimer, the term of this patent is extended or adjusted under 35 U.S.C. 154(b) by 220 days.

This patent is subject to a terminal disclaimer.

(21) Appl. No.: 12/057,646

(22) Filed: Mar. 28, 2008

(65) Prior Publication Data

US 2008/0215329 A1    Sep. 4, 2008

Related U.S. Application Data

(60) Continuation of application No. 11/509,390, filed on Aug. 24, 2006, now Pat. No. 7,542,901, which is a division of application No. 10/107,723, filed on Mar. 27, 2002, now Pat. No. 7,143,035.

(51) Int. Cl.
*G10L 15/06* (2006.01)
*G10L 15/10* (2006.01)
*G10L 15/18* (2006.01)

(52) U.S. Cl. .................... 704/238; 704/245; 704/256.3; 704/257

(58) Field of Classification Search ................. 704/238, 704/245, 255, 256.3, 275, 257
See application file for complete search history.

(56) References Cited

U.S. PATENT DOCUMENTS 5,390,279 A * 2/1995 Strong ........................ 704/200

(Continued)

OTHER PUBLICATIONS

Goodman, "Putting it all together: lanugage model combination", 2000 IEEE International Conference on Acoustics, Speech, and Signal Processing, 2000, ICASSP '00, Jun. 5, 2000 to Jun. 9, 2000, vol. 3, pp. 1647 to 1650.*

(Continued)

*Primary Examiner*—Martin Lerner
(74) *Attorney, Agent, or Firm*—Wolf, Greenfield & Sacks, P.C.

(57) ABSTRACT

Techniques are provided for generating improved language modeling. Such improved modeling is achieved by conditioning a language model on a state of a dialog for which the language model is employed. For example, the techniques of the invention may improve modeling of language for use in a speech recognizer of an automatic natural language based dialog system. Improved usability of the dialog system arises from better recognition of a user's utterances by a speech recognizer, associated with the dialog system, using the dialog state-conditioned language models. By way of example, the state of the dialog may be quantified as: (i) the internal state of the natural language understanding part of the dialog system; or (ii) words in the prompt that the dialog system played to the user.

13 Claims, 3 Drawing Sheets

U.S. PATENT DOCUMENTS

| | | | | |
|---|---|---|---|---|
| 5,640,487 | A * | 6/1997 | Lau et al. | 704/243 |
| 5,675,707 | A * | 10/1997 | Gorin et al. | 704/257 |
| 5,745,876 | A * | 4/1998 | Kneser et al. | 704/255 |
| 6,049,767 | A * | 4/2000 | Printz | 704/240 |
| 6,052,657 | A * | 4/2000 | Yamron et al. | 704/9 |
| 6,073,095 | A * | 6/2000 | Dharanipragada et al. | 704/242 |
| 6,173,261 | B1 * | 1/2001 | Arai et al. | 704/257 |
| 6,246,981 | B1 | 6/2001 | Papineni et al. | |
| 6,470,314 | B1 * | 10/2002 | Dharanipragada et al. | 704/231 |
| 6,681,206 | B1 * | 1/2004 | Gorin et al. | 704/243 |
| 6,754,626 | B2 * | 6/2004 | Epstein | 704/235 |
| 6,839,671 | B2 * | 1/2005 | Attwater et al. | 704/255 |
| 6,999,931 | B2 * | 2/2006 | Zhou | 704/275 |
| 7,085,720 | B1 * | 8/2006 | Gorin et al. | 704/257 |
| 7,143,035 | B2 * | 11/2006 | Dharanipragada et al. | 704/244 |
| 7,236,931 | B2 * | 6/2007 | He et al. | 704/235 |
| 7,542,901 | B2 * | 6/2009 | Dharanipragada et al. | 704/243 |
| 2002/0032564 | A1 * | 3/2002 | Ehsani et al. | 704/235 |
| 2003/0191625 | A1 * | 10/2003 | Gorin et al. | 704/1 |

OTHER PUBLICATIONS

Martin et al., "Smoothing methods in maximum entropy language modeling", 1999 International Conference on Acoustics, Speech, and Signal Processing, 1999, ICASSP '99, Mar. 15, 1999 to Mar. 19, 1999, vol. 1, pp. 545 to 548.*

S. Axelrod, "Natural Language Generation in the IBM Flight Information System," Proceedings of the Workshop on Conversational Systems at ANLP-NAACL, pp. 21-26, 2000.

S.F. Chen et al., "An Empirical Study of Smoothing Techniques for Language Modeling," Technical Report TR-10-98, Harvard University, pp. 1-64, Aug. 1998.

S. Della Pietra et al, "Inducing Features of Random Fields," IEEE Transactions on Pattern Analysis and Machine Intelligence, vol. 19(4), pp. 380-393, 1997.

A. Ratnaparkhi, "Trainable Methods for Surface Natural Language Generation," Proceedings of the 1st Meeting of the North American Chapter of the Association of Computational Linguistics (NAACL 2000), Seattle, Washington, USA, pp. 194-201.

* cited by examiner

METHODS AND APPARATUS FOR GENERATING DIALOG STATE CONDITIONED LANGUAGE MODELS

CROSS-REFERENCE TO RELATED APPLICATIONS

This application is a continuation of U.S. application Ser. No. 11/509,390, filed on Aug. 24, 2006, now issued as U.S. Pat. No. 7,542,901, the disclosure of which is incorporated herein by reference. U.S. application Ser. No. 11/509,390 is a divisional of U.S. application Ser. No. 10/107,723, filed Mar. 27, 2002, now issued as U.S. Pat. No. 7,143,035, the disclosure of which is incorporated by reference herein.

FIELD OF THE INVENTION

The present invention relates to language modeling and, more particularly, to language modeling techniques for use in dialog systems.

BACKGROUND OF THE INVENTION

The job of a language model is to make available to a speech recognizer estimates of probabilities of sequences of words. State of the art language models are known as trigram models. Trigram models predict the probability of a word by using the previous two words. The probability of a sequence of words is given by the product of the probability of each word given the previous two words. The probability of a word w given the previous two words x y is estimated from a training corpus of text as the number of the words x y w that occurred in that sequence divided by the number of times that the words x y occurred together.

Even for modest vocabularies, this estimate is poor in that a large number of trigrams will never be seen in training. Thus, state of the art language models attempt to smooth these probabilities using bigram, unigram and uniform probability distributions. However, the method used for smoothing can influence the overall quality of the model especially for small amounts of training data.

An alternative to the trigram language models described above is to have a fixed finite grammar of utterance, and only allow sequences in the grammar to be recognized. This scheme is highly restrictive for natural language applications in which there is no way to tabulate all ways that a user might convey a certain concept.

Thus, there is a need for techniques that provide improved language models for use by a speech recognizer.

SUMMARY OF THE INVENTION

The present invention provides techniques for generating improved language modeling. Such improved modeling is achieved by conditioning a language model on a state of a dialog for which the language model is employed. For example, the techniques of the invention may improve modeling of language for use in a speech recognizer of an automatic natural language based dialog system. Improved usability of the dialog system arises from better recognition of a user's utterances by a speech recognizer, associated with the dialog system, using the dialog state-conditioned language models.

Thus, in one aspect of the invention, a technique for use in accordance with a dialog system comprises generating at least one language model, the at least one language model being conditioned on a state of dialog associated with the dialog system, and storing the at least one language model for subsequent use in accordance with a speech recognizer associated with the dialog system.

In one embodiment, the operation of generating the at least one language model conditioned on a state of dialog associated with the dialog system may comprise: (i) dividing training data which is labeled by state into different state sets depending on the state to which the training data belongs; and (ii) building a separate language model for each of the state sets.

In a second embodiment, the operation of generating the at least one language model conditioned on a state of dialog associated with the dialog system may comprise building a model with one or more feature functions incorporating the state of dialog.

In a third embodiment, the operation of generating the at least one language model conditioned on a state of dialog associated with the dialog system may comprise: (i) caching words in a prompt presented to a user by the dialog system; (ii) building a unigram model on the cached words; and (iii) interpolating the unigram model with a baseline model.

By way of example, the state of the dialog may be quantified as: (i) the internal state of the natural language understanding part of the dialog system; or (ii) words in the prompt that the dialog system played to the user.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The present invention will be explained below in the context of an illustrative natural language based dialog system. However, it is to be understood that the present invention is not limited to a natural language based dialog system or any particular dialog system. Rather, the invention is more generally applicable to any speech recognition application in which it is desirable to improve recognition results by improving the language models employed by the speech recognition application.

Thus, as will be illustratively described below, the invention provides methods to better model language in a dialog given that some information about the state of the dialog is available. The state of a dialog may be quantified, for example, as either the internal state of the natural language understanding (NLU) part of a dialog system or words in the prompt that the dialog system played to the user.

Modeling language in this state dependent way significantly improves the recognition performance of a dialog system as measured by the word error rate. The invention uses at least a small amount of training data for which the state of the system is known. Thus, preferably, only a part of the training data is labeled with state.

Figure 1:
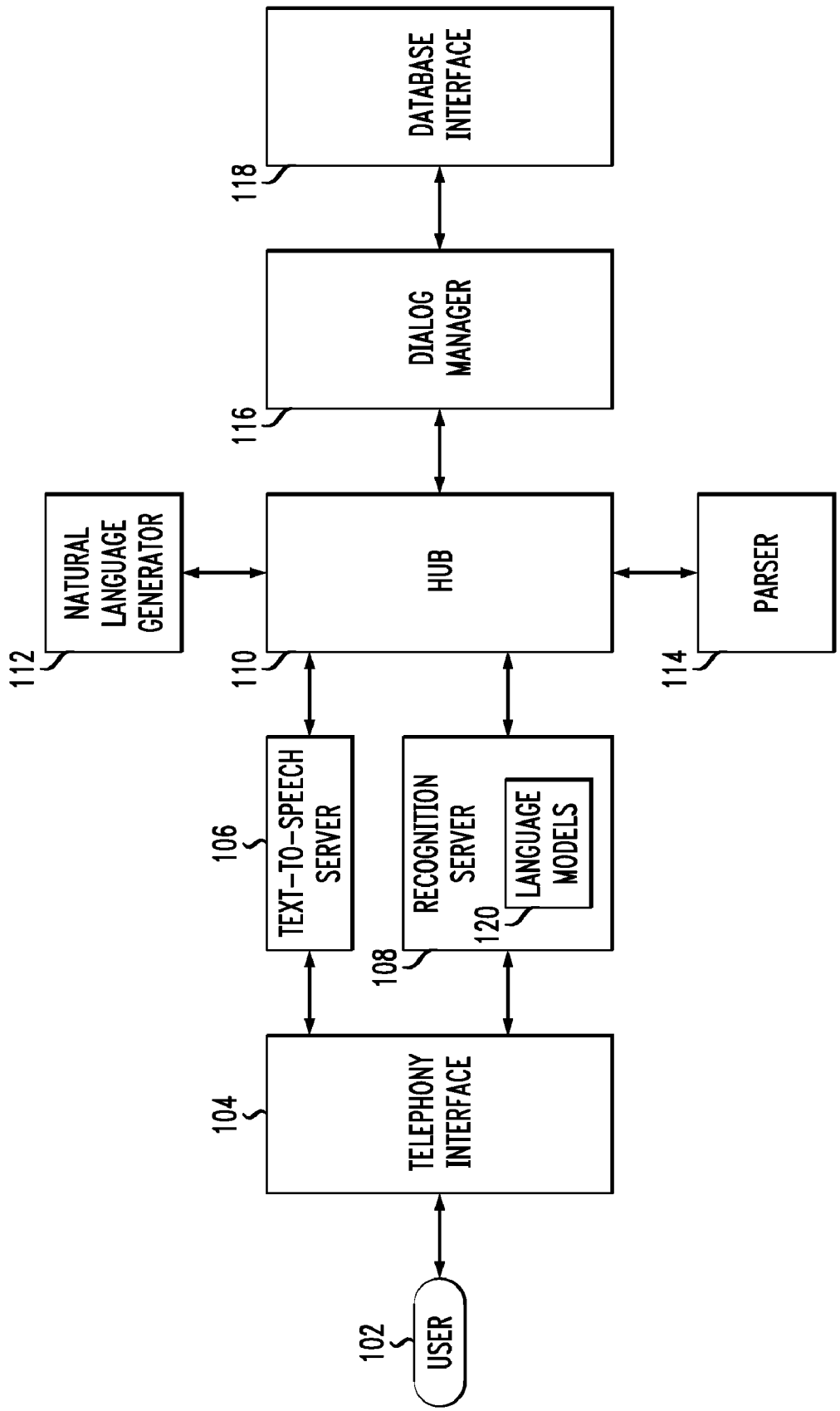
FIG. 1 is a block diagram illustrating a natural language based dialog system in which the present invention may be implemented.

Referring now to FIG. 1, a block diagram illustrates a natural language based dialog system 100 in which the present invention may be implemented. As show, the dialog system 100, which may be employed by user 102, comprises a telephony interface 104, a text-to-speech server 106, a recognition server 108, a hub 110, a natural language generator 112, a parser 114, a dialog manager 116 and a database interface 118. Also, the dialog system 100 comprises one or more language models 120, shown in FIG. 1 in accordance with the recognition server 108.

In general, the dialog system 100 operates as follows. The hub 110 is operatively coupled to the various other functional elements of the dialog system 100 and serves to control and interact with such elements. It is to be understood that some or all of the individual elements of the dialog system 100 may be collocated or remotely located with respect to one another. For example, the elements shown in FIG. 1 may be coupled via a public network such as the Internet or World Wide Web, or a private network such as a local area network, or some other suitable network, or even a combination of the various network types.

Among other functions, the hub 110 initializes each of the other system elements and controls data flow therebetween. Thus, under control of the hub 110, the dialog system 100 receives input, e.g., in the form of speech, from the user 102 via the telephony interface 104. The telephony interface 104 is coupled to a telephone (wireless or wired) and the telephone system structure (not shown) necessary to allow the user to access the dialog system and to have the user's speech transmitted to the dialog system and system responses transmitted back to the user.

The hub 110 controls the passing of the speech data to the recognition server 108. The recognition server 108 performs speech recognition on the speech data using the one or more language models 120. Speech recognition may be performed in a conventional manner. As will be described below in detail, the one or more language models are preferably generated in accordance with the invention. Given that the models are conditioned on the state of the dialog that occurs between the user 102 and the dialog system 100, speech recognition performance is improved.

The recognition server 108 passes recognized text back to the hub 110. The hub 110 then passes the recognized text to the natural language generator 112 which generates a semantic representation of the recognized text, using the parser 114, as is known in the art, e.g., as described in A. Ratnaparkhi, "Trainable Methods for Surface Natural Language Generation," Proceedings of the 1st Meeting of the North American Chapter of the Association of Computational Linguistics (NAACL 2000), pp. 194-201, Seattle, Wash., USA; and S. Axelrod, "Natural Language Generation in the IBM Flight Information System," Proceedings of the Workshop on Conversational Systems at ANLP-NAACL, 2000, the disclosures of which are incorporated by reference herein.

The natural language generator 112 then passes the semantic representation of the recognized text back to the hub 110. The hub 110 then passes the semantic representation to the dialog manager 116. The dialog manager 116 communicates with an information database (not shown), via database interface 118, to generate a response to be provided to the user 102.

The dialog manager 116 passes the response back to the hub 110. The hub 110 then passes the response to the text-to-speech synthesizer 106, which converts the response to synthesized speech data. The resulting synthesized speech data is sent over the telephone interface 104 back to the user 102 and presented to the user as an audible output.

It is to be understood that the state of the dialog, upon which the language models generated in accordance with the present invention are conditioned on, may be kept track of in the dialog manager 116. One example of a dialog manager that may be employed in the dialog system 100 of FIG. 1 is the dialog manager and associated components described in U.S. Pat. No. 6,246,981 issued on Jun. 12, 2001 to K. A. Papineni et al., the disclosure of which is incorporated by reference herein.

It is also to be understood that the user speech may be originally provided in response to a spoken prompt synthesized and output by the dialog system. The prompt may be generated in a manner similar to that explained above for generating a response to the user. As will be explained below, it is such a prompt upon which the language models 120 may preferably be, in at least one embodiment, conditioned so as to improve recognition accuracy with respect to the spoken utterances provided by the user 102. However, it is to be understood that a response or any output provided by the dialog system may also be considered a "prompt."

It should be understood that the present invention focuses on the language models 120. As a result, the respective functions associated with the hub 110, the text-to-speech server 106, the recognition server 108, the natural language generator 112, the parser 114 and the dialog manager 116 may be performed by conventional units, known to those skilled in the art.

Three illustrative embodiments will now be described, in the context of FIGS. 2A through 4, for conditioning language models on the state of the dialog in accordance with the present invention. As explained above, these language models may then be used by the recognition server 108 in the dialog system 100 to recognize user provided speech data. As will be made evident below, FIGS. 2A and 2B and FIG. 3 respectively illustrate embodiments wherein the state of a dialog may be quantified, for example, as either the internal state of the natural language understanding part of a dialog system (e.g., NLU generator 112) or words in the prompt that the dialog system played to the user, while FIG. 4 illustrates an embodiment wherein the state of a dialog may be quantified, for example, in accordance with words in the prompt.

Figure 2A:
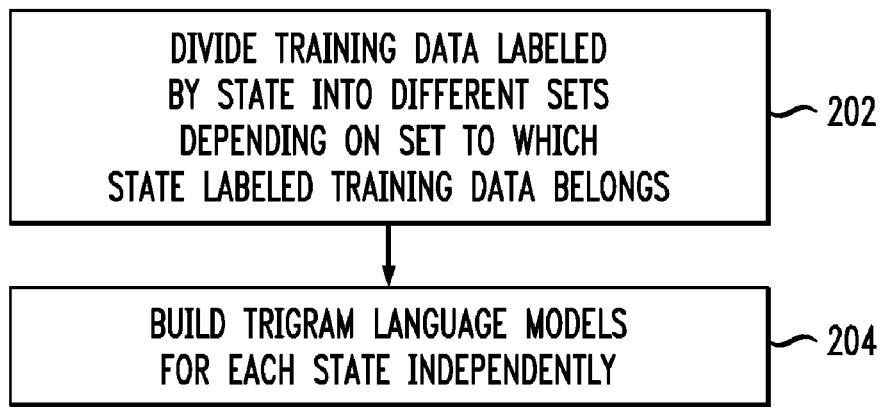
FIGS. 2A and 2B are flow diagrams illustrating a method of conditioning a language model on the state of the dialog according to a first embodiment of the present invention.
Figure 2B:
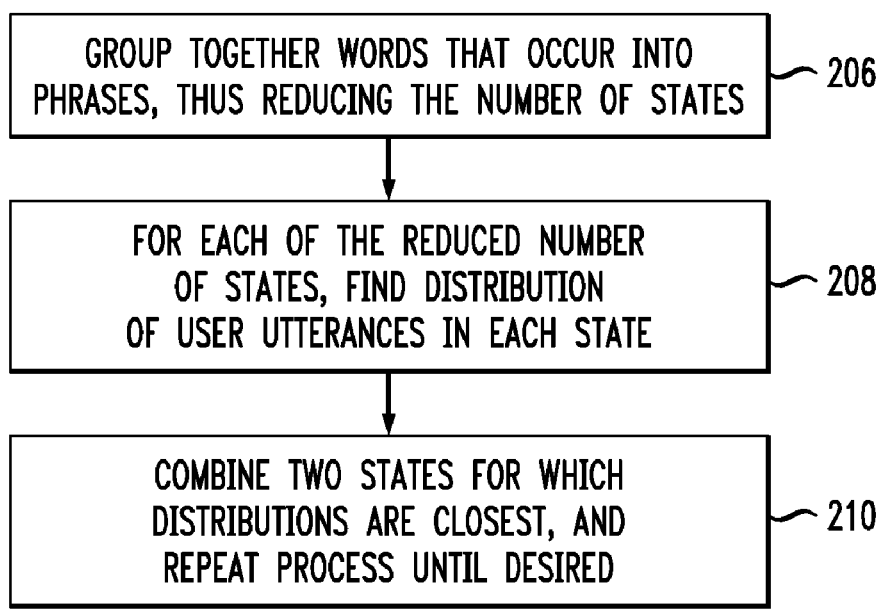

Referring now to FIGS. 2A and 2B, flow diagrams illustrate a method of conditioning a language model on the state of the dialog according to a first embodiment of the present invention. More specifically, FIGS. 2A and 2B illustrate a linear interpolation method 200 for accomplishing this task.

In accordance with the linear interpolation method, in step 202 of FIG. 2A, the training data which is labeled by state is divided into different sets depending on the state to which the training data belongs. It is to be understood that the state information used for labeling is the "state" as maintained within the dialog system. The state of the system is an indication of what the system expects the user to provide. The training data labeled by state is obtained by having people call the dialog system. Each user utterance occurs when the system is in a particular state. The state in which the user utterance occurs is stored and the user utterance is transcribed to language model training data labeled with state. Examples of state labeling in a travel reservation context are:

| State | User utterance |
|---|---|
| DATE | Tomorrow |
| TO | First class to Memphis |
| TIME | I want to arrive no later than two p.m. |

In step 204, trigram language models are then built for each of the states independently. Each of these models are preferably built using the modified Kneser-Ney smoothing technique, e.g., as described in S. F. Chen et al., "An Empirical Study of Smoothing Techniques for Language Modeling," Technical Report TR-10-98, Harvard University, August 1998, the disclosure of which is incorporated by reference herein. Since typically there is only a small amount of data available for each state, each of these models is preferably interpolated with a base model obtained from all the training data that is available for the domain.

The linear interpolation technique provides even more improvement when there are a small number of states to condition on. Since there may be a significantly large number of states associated with the prompt provided by the dialog system to the user, conditioning the system on the words in the prompt may not always be practical. To allow more practical conditioning, the invention provides for clustering together some of the large number of states to effectively reduce the number of states. An illustrative embodiment of a clustering technique of the invention will now be described in detail in the context of FIG. 2B.

First, in step 206, words that occur often are clubbed or grouped together into phrases, thus reducing the number of states. For example, one common system prompt might be: "How may I help you?" Instead of treating these words separately, they are treated as a phrase "How_may_i_help_you". Instead of using the individual words in the prompt, phrases that often occur in questions are used. With these reduced number of states, in step 208, the distribution of user utterances in each of these states is determined. Consider two states $s_1$, $s_2$. Let the distributions in these states be $P_1$ and $P_2$, respectively. The distance measure D that may preferably be used to perform the clustering in accordance with the invention is:

$$D(P_1,P_2)=(\pi_1+\pi_2)H(\pi_1 P_1+\pi_2 P_2)-\pi_1 H(P_1)-\pi_2 H(P_2)$$

where $\pi_1$, $\pi_2$ are the fraction of data occurring in state $s_1$, and $s_2$, respectively. H represents the entropy of a given distribution. Given a probability distribution P(i); H(P) is the negative sum of P(i)log P(i), i.e., $H(P)=-\Sigma_i P(i) \log P(i)$.

Then, in step 210, the two states for which the word distributions are closest are combined. The process in step 210 is repeated until the desired number of states is reached.

Figure 3:
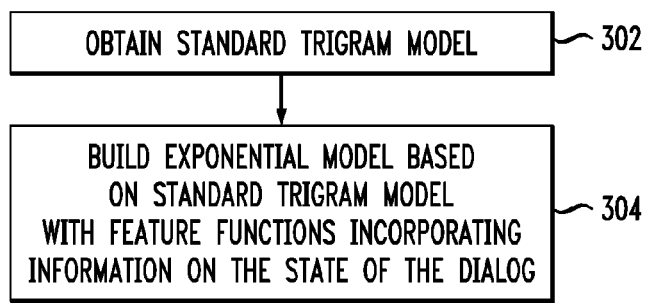
FIG. 3 is a flow diagram illustrating a method of conditioning a language model on the state of the dialog according to a second embodiment of the present invention.
Figure 4:
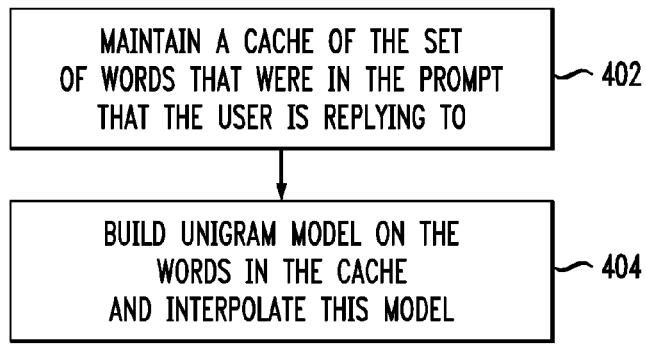
FIG. 4 is a flow diagram illustrating a method of conditioning a language model on the state of the dialog according to a third embodiment of the present invention.

Referring now to FIG. 3, a flow diagram illustrates a method of conditioning a language model on the state of the dialog according to a second embodiment of the present invention. More specifically, FIG. 3 illustrates a maximum entropy/minimum divergence modeling method 300 for accomplishing this task.

The maximum entropy/minimum divergence modeling approach of the invention builds trigram models with features that depend on the state of the dialog. When the space of values that the state can take is large, it is more natural to build exponential models with feature functions incorporating information of the state of the dialog. Such models built in accordance with the invention are of the form:

$$P(w_i|w_{i-1},w_{i-2},s,p) = \left( \frac{P(w_i|w_{i-1},w_{i-2})\exp\left(\sum_j \lambda_j f_{j(w_i,s,p)}\right)}{Z(\lambda,s,p,w_{i-1},w_{i-2})} \right)$$

In the above equation, s refers to the state, p refers to the prompt, $f_j$ are binary valued functions and $Z(\lambda,s,p,w_{i-1},w_{i-2})$ is a normalizing term chosen so that $\Sigma_w P(w|w_{i-1},w_{i-2},s,p)=1$ for all $s,p,w_{i-1},w_{i-2}$. It is also to be noted that $P(w_i|w_{i-1},w_{i-2})$ is a regular trigram model built in the standard way from all the training data.

Thus, the process begins in step 302 by obtaining a regular trigram model built in the standard way from all the training data. Then, in step 304, an exponential model such as that described by the above equation is built, based on the standard trigram model.

The parameters $\lambda_j$ of the exponential model are chosen to maximize likelihood of the training data. This optimization may preferably be performed using the well known improved iterative scaling algorithm, e.g., as described in S. Della Pietra et al., "Inducing Features of Random Fields," IEEE Transactions on Pattern Analysis and Machine Intelligence, vol. 19(4), pp. 380-393, 1997, the disclosure of which is incorporated by reference herein. The only remaining ingredient is the choice of the set of feature functions. This choice can be based on the number of times that the features occur in training data or the gain in likelihood by using a certain feature.

Feature functions are binary valued, i.e., a value of 1 when a particular word occurs in a particular state, and a value of 0 otherwise. We want to choose those feature functions that have a significant amount of information about what the user might say. For example, when the system is in the state "TO" (it is expecting a destination), the words "want to fly to <place name>" are probably very likely. Feature functions that capture this turn on when these words occur in the "TO" state and therefore boost the probability of their occurrence in the "TO" state. Those features that have the most effect on the likelihood of the training data are chosen. Another example of such useful features is the words "first one" occurring in dialog state "LIST", where the system expects the user to choose from a list of options listed in the prompt.

Referring now to FIG. 4, a flow diagram illustrates a method of conditioning a language model on the state of the dialog according to a third embodiment of the present invention. More specifically, FIG. 4 illustrates a prompt word caching method 400 for accomplishing this task.

In accordance with this way of using state information, the idea is that the user is more likely to use words/phrases that were in the prompt than others. Thus, in accordance with this approach, as shown in step 402, a cache of the set words that were in the prompt that the user is replying to is maintained. Then, the probability of words that occur in the prompt is increased. This is accomplished, in step 404, by building a unigram model on the words in the cache and interpolating this model with a baseline model. The baseline model referred to here is a regular trigram language model trained from all data available for the domain. In general, this model could also include state information as described in the first embodiment of the present invention (FIGS. 2A and 2B). Essentially, any model that is in use that does not explicitly use the information in the system prompt could be enhanced by using a cache of words which occur in the system prompt.

The three above-described methods of using the state to model language were respectively used for an automated flight travel reservation task. It was found that the linear interpolation method (FIGS. 2A and 2B) gives the most improvement when the prompt phrases are clustered to give six states. The word error rate was reduced from 20.5 percent to 18.4 percent.

Figure 5:
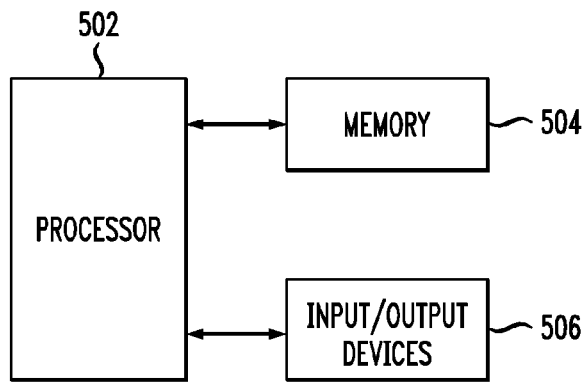
FIG. 5 is a block diagram illustrating a generalized hardware architecture of a computer system suitable for implementing techniques according to the present invention.

Referring now to FIG. 5, a block diagram is shown illustrating a generalized hardware architecture of a computer system suitable for implementing the various functional elements of an automatic natural language based dialog system such as dialog system 100 in FIG. 1. The block diagram may also be considered as illustrating a generalized hardware architecture of a computer system suitable for generating language models in accordance with the illustrative methodologies described above in the context of FIGS. 2A through 4.

It is to be understood that one or more elements of the dialog system 100 may be implemented on one such computer system or on more than one such computer system. For example, individual elements shown in FIG. 1 (e.g., hub 110, recognition server 108, etc.) may be implemented on individual computer systems coupled via a suitable network. However, two or more elements may be implemented on the same computer system. Also, in the case where the computer system architecture shown in FIG. 5 is employed solely to generate dialog state conditioned language models, the techniques may employ more than one such computer system.

As shown, the computer system 500 may be implemented in accordance with a processor 502, a memory 504 and input/output devices 506. It is to be appreciated that the term "processor" as used herein is intended to include any processing device, such as, for example, one that includes a CPU (central processing unit) and/or other processing circuitry. The term "memory" as used herein is intended to include memory associated with a processor or CPU, such as, for example, RAM, ROM, a fixed memory device (e.g., hard drive), a removable memory device (e.g., diskette), flash memory, etc. In addition, the phrase "input/output devices" or "I/O devices" as used herein is intended to include, for example, one or more input devices (e.g., microphone, keyboard, mouse, etc.) for entering data to the processing unit, and/or one or more output devices (e.g., CRT display, printer, audio speaker, etc.) for presenting results associated with the processing unit. It is also to be understood that the term "processor" may refer to more than one processing device and that various elements associated with a processing device may be shared by other processing devices.

Accordingly, software components including instructions or code for performing the methodologies of the invention, as described herein, may be stored in one or more of the associated memory devices (e.g., ROM, fixed or removable memory) as an article of manufacture and, when ready to be utilized, loaded in part or in whole (e.g., into RAM) and executed by a CPU. Also, language models generated in accordance with the invention may be stored in such memory.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for use in accordance with a dialog system, the method comprising:
   generating at least one language model, the at least one language model being conditioned on a state of dialog associated with the dialog system; and
   storing the at least one language model for subsequent use in accordance with a speech recognizer associated with the dialog system;
   wherein generating the at least one language model conditioned on a state of dialog associated with the dialog system further comprises:
       dividing training data which is labeled by state into different state sets depending on the state to which the training data belongs;
       clustering the state sets into clustered state sets, the clustering comprising combining training data belonging to states that are close to each other based on a distance measure;
       building a separate language model for each of the clustered state sets to create a plurality of separate language models; and
       building at least one interpolated model by interpolating one or more of the plurality of separate language models with a base model obtained from training data that includes at least some training data used to train all of the plurality of separate language models.

2. The method of claim 1, wherein the dialog system is a natural language understanding based dialog system.

3. The method of claim 2, wherein the state corresponds to an internal state of the natural language understanding part of the dialog system.

4. The method of claim 1, wherein the state corresponds to a prompt that the dialog system presents to a user.

5. The method of claim 1, wherein each separate language model is a trigram language model.

6. The method of claim 1, wherein each separate language model is built using a modified Kneser-Ney smoothing technique.

7. The method of claim 1, wherein each separate language model is interpolated with a base model obtained from available training data for a domain of the dialog system.

8. The method of claim 1, wherein a decision to cluster two states is based on a distance measure computed between respective word distributions associated with the two states.

9. Apparatus for use in accordance with a dialog system, the apparatus comprising:
   at least one processor operative to generate at least one language model, the at least one language model being conditioned on a state of dialog associated with the dialog system; and
   memory, coupled to the at least one processor, for storing the at least one language model for subsequent use in accordance with a speech recognizer associated with the dialog system;
   wherein the operation of generating the at least one language model conditioned on a state of dialog associated with the dialog system further comprises: (i) dividing training data which is labeled by state into different state sets depending on the state to which the training data belongs; (ii) clustering the state sets into clustered state sets, the clustering comprising combining training data belonging to states that are close to each other based on a distance measure; (iii) building a separate language model for each of the clustered state sets to create a plurality of separate language models; and (iv) building at least one interpolated model by interpolating one or more of the plurality of separate language models with a base model obtained from training data that includes at least some training data used to train all of the plurality of separate language models.

10. The apparatus of claim 9, wherein the dialog system is a natural language understanding based dialog system.

11. The apparatus of claim 10, wherein the state corresponds to an internal state of the natural language understanding part of the dialog system.

12. The apparatus of claim 9, wherein the state corresponds to a prompt that the dialog system presents to a user.

13. At least one memory device storing instructions that, when executed by at least one processor, perform a method for use in accordance with a dialog system, the method comprising:

generating at least one language model, the at least one language model being conditioned on a state of dialog associated with the dialog system; and storing the at least one language model for subsequent use in accordance with a speech recognizer associated with the dialog system;

wherein generating the at least one language model conditioned on a state of dialog associated with the dialog system further comprises:

dividing training data which is labeled by state into different state sets depending on the state to which the training data belongs;

clustering the state sets into clustered state sets, the clustering comprising combining training data belonging to states that are close to each other based on a distance measure;

building a separate language model for each of the clustered state sets to create a plurality of separate language models; and building at least one interpolated model by interpolating one or more of the plurality of separate language models with a base model obtained from training data that includes at least some training data used to train all of the plurality of separate language models.

* * * * *